United States Patent [19]
Ishii et al.

[11] Patent Number: 5,932,034
[45] Date of Patent: Aug. 3, 1999

[54] METHOD OF PRODUCING HYDROGEN ABSORBING ALLOY POWDER, AND ELECTRODE USING HYDROGEN ABSORBING ALLOY POWDER PRODUCED BY SAID METHOD

[75] Inventors: Masatoshi Ishii; Hiroyuki Miyamoto; Yukihiro Kuribayashi; Masanobu Uchida, all of Fukui-ken; Hajime Kitamura, Ibaraki-ken, all of Japan

[73] Assignee: Shin-etsu Chemical Co., Ltd., Tokyo, Japan

[21] Appl. No.: 08/950,742

[22] Filed: Oct. 15, 1997

[30] Foreign Application Priority Data

Oct. 16, 1996 [JP] Japan .................................. 8-294473
Oct. 18, 1996 [JP] Japan .................................. 8-297121
Oct. 18, 1996 [JP] Japan .................................. 8-297122

[51] Int. Cl.$^6$ ...................................... H01M 4/04
[52] U.S. Cl. .......................... 148/513; 148/253; 420/900; 429/59
[58] Field of Search ................... 148/253, 254, 148/513; 429/59; 420/900

[56] References Cited

U.S. PATENT DOCUMENTS 5,605,585  2/1997  Yamamoto et al. ..................... 148/513
5,695,530  12/1997 Hong et al. ............................. 429/101

FOREIGN PATENT DOCUMENTS 7-288129  10/1995  Japan .

OTHER PUBLICATIONS

Patent Abstracts of Japan, vol. 096, No. 002, Feb. 29, 1996 & JP 07 2881929 (Shin Etsu Chem Co Ltd), Oct. 31, 1995.
Patent Abstracts of Japan, vol. 017, No. 152 (E–1340), Mar. 25, 1993 & JP 04 319258, (Furukawa Battery Co Ltd: The), Nov. 10, 1992.
Patent Abstracts of Japan, vol. 095, No. 009, Oct. 31, 1995 & JP 07 153460, (Sanyo Electric Co Ltd), Jun. 16, 1995..
Patent Abstracts of Japan, vol. 097, No. 007, Jul. 31, 1997 & JP 09 063581 (Furukawa Electric Co Ltd: The; Furukawa Battery Co Ltd: The), Mar. 7, 1997.
Patent Abstracts of Japan, vol. 017, No. 628 (M–1512), Nov. 19, 1993 & JP 05 195008 (Matsushita Electric Ind Co Ltd), Aug. 3, 1993.

*Primary Examiner*—George Wyszomierski
*Attorney, Agent, or Firm*—Miller, White, Zelano, & Branigan, P.C.

[57] ABSTRACT

A method of producing a hydrogen absorbing alloy powder, which comprises a step of treating a pulverized hydrogen absorbing alloy with a solution comprising a condensed phosphoric acid having 2 to 20 phosphorus atoms, phytic acid or a mixture thereof; and a negative electrode using a hydrogen absorbing alloy powder produced by the aforesaid method, which can ensure high initial activity and high initial capacity in the nickel-hydrogen secondary battery provided therewith.

14 Claims, No Drawings

METHOD OF PRODUCING HYDROGEN ABSORBING ALLOY POWDER, AND ELECTRODE USING HYDROGEN ABSORBING ALLOY POWDER PRODUCED BY SAID METHOD

FIELD OF THE INVENTION

The present invention relates to a hydrogen absorbing alloy powder having excellent keeping quality and, particularly to, a method of producing a hydrogen absorbing alloy powder which is used for the negative electrode of a nickel-hydrogen secondary battery to ensure satisfactory initial activity therein. Further, the invention concerns an electrode using the hydrogen absorbing alloy powder produced by the aforesaid method.

BACKGROUND OF THE INVENTION

Since the alloys capable of absorbing and absorbing hydrogen (which are abbreviated as "hydrogen absorbing alloys" hereinafter) were discovered, they have been applied to not only a hydrogen absorbing means but also a battery and the like. In particular, alkaline secondary batteries utilizing such alloys were already used practically, and the hydrogen absorbing alloys used therein have undergone successive improvements with the intention of heightening the battery capacity and lengthening the battery life.

More specifically, in the initially studied $LaNi_5$ hydrogen absorbing alloy having a $CaCu_5$ type crystal structure, it has been tried to partially replace the La by other rare earth elements, such as Ce, Pr and Nd, and the Ni by other metal elements, such as Al, Co and Mn, thereby enabling the secondary battery to have a higher capacity and a longer life.

However, such a replacement in the hydrogen absorbing alloy caused a drop in the initial activity of a secondary battery when the resultant alloy was used for a negative electrode of the battery although it was successful in heightening the battery capacity and lengthening the battery life.

The initial activity of a secondary battery is, in general, expressed in terms of the number of charge-discharge cycles repeated until the battery reaches the maximum capacity, so that the initial activity is considered to be higher the smaller such a number is. Usually, the initial activity is evaluated by the capacity in the first cycle and the number of charge-discharge cycles repeated until the battery reaches the maximum capacity.

When a secondary battery having a low initial activity is sealed hermetically, the balance between positive and negative electrodes is lost decreasing the battery capacity and the battery life.

In order to solve the aforementioned problem, it has so far been known to treat hydrogen absorbing alloys with acids or alkalis. However, these treatments have defects that not only the alloy is subject to surface oxidation during treatment but also the treated alloy is liable to oxidation upon drying and storage, so that they are insufficient in the ease of the handling and cannot ensure sufficient stability in the treated alloy.

SUMMARY OF THE INVENTION

As a result of our intensive studies of hydrogen absorbing alloy powders for the negative electrode of a secondary battery and methods of producing such alloy powders for the purpose of solving the foregoing problems, it has been found that the treatment of a pulverized hydrogen absorbing alloy with a solution comprising a condensed phosphoric acid, phytic acid or a mixture thereof enabled simple preparation of a hydrogen absorbing alloy powder having excellent keeping quality and easiness of handling. When the hydrogen absorbing alloy powder which has undergone the aforesaid treatment was applied to the negative electrode of a nickel-hydrogen secondary battery, the initial activity of the battery was elevated without attendant lowering of the battery capacity and life, thereby achieving the present invention.

Therefore, a first object of the present invention is to provide a method of producing a hydrogen absorbing alloy powder having excellent keeping quality and easiness of handling.

A second object of the present invention is to provide a negative electrode used for a nickel-hydrogen secondary battery having an excellent initial activity.

The aforementioned objects of the present invention are attained by a method of producing a hydrogen absorbing alloy powder, which comprises a step of treating a pulverized hydrogen absorbing alloy with a solution comprising a condensed phosphoric acid having 2 to 20 phosphorus atoms, phytic acid or a mixture thereof.

DETAILED DESCRIPTION OF THE INVENTION

The hydrogen absorbing alloy used in the present invention has no particular restriction, but it can be selected properly from hydrogen absorbing alloys known to be usable for negative electrodes, including hydrogen absorbing Ti alloys of $AB_n$ (n=1 or 2) type, hydrogen absorbing Zr alloys of $AB_2$ type and hydrogen absorbing rare earth alloys of $AB_5$ type. In particular, the use of a hydrogen absorbing alloy basically having a composition of $MmNi_5$ is appropriate from the viewpoint of ensuring a satisfactory cycle life in the secondary battery. The symbol Mm in the foregoing composition is referred to as "a Mish metal", or a mixture of rare earth elements including La, Ce, Pr, Nd and the like. In view of further improvement in cycle life, it is desirable for the hydrogen absorbing alloy of $MmNi_5$ type that the nickel thereof is partially replaced by not only Mn but also Al, and further by Co.

The hydrogen absorbing alloys especially preferred in the present invention are alloys represented by the compositional formula $(La)_x R_{1-x}(Ni_a M_b)$, wherein R is Ce, Pr, Nd or a mixture of two or more thereof, M is at least one metallic element selected from a group consisting of Mn, Al, Co, Ti, Fe, Cu and Zr, x is from 0.2 to 1, a+b is from 4.0 to 6.0, and $0 < b \leq 2.0$.

Those metals are mixed so as to have the foregoing composition, fused together, and then cooled to prepare an ingot. Further, the ingot is ground into a powder by means of a grinder such as a ball mill, a jet mill or a pulverizer. The thus obtained powder is used in the treatment according to the present invention.

In the present invention, a pulverized hydrogen absorbing alloy is treated with a solution comprising a condensed phosphoric acid and/or phytic acid, and further washed with water, if needed, for the purpose of producing a hydrogen absorbing alloy powder which has a high keeping quality and easiness of handling and further ensures a satisfactory initial activity in a secondary battery when the alloy is used for the negative electrode of the battery. In the step of washing the treated alloy powder, the use of alkali for neutralization is effective in many cases to produce an improvement on the characteristics of the treated alloy powder.

The present treatment is generally carried out at a temperature ranging from room temperature to 130° C., preferably from room temperature to 100° C. And it may be performed under a pressure of 10 kgf/cm² or below in an airtight vessel, if desired. The treatment performed under a high temperature or while cooling is undesirable in view of economy, because it entails too high a cost of equipment and facilities for production on an industrial scale. In particular, the treatment carried out while cooling is impractical, because the treatment time becomes too long.

The treatment time is preferably chosen from the range of 10 minutes to 10 hours, and adjusted properly depending on the treatment temperature. In other words, the treatment time is shortened when the treatment temperature is high; while it is lengthened when the treatment temperature is low.

Further, it is desirable that the concentration of a condensed phosphoric acid, phytic acid or a mixture of these acids in the treating bath be from about 0.01 to 10 weight %, preferably from 0.1 to 1 weight %, based on the hydrogen absorbing alloy treated therein. When the concentration is lower than 0.01 weight %, the keeping quality improving effect produced by the treatment becomes insufficient; while, when the concentration is higher than 10 weight %, the hydrogen absorbing-desorbing reaction is suppressed by the acid used to result in a decrease of hydrogen storage capacity.

The condensed phosphoric acids which can be used in the solution for the present treatment include polyphosphoric acids which are produced by linear condensation of orthophosphoric acid and represented by formula, $H_{n+2}P_nO_{3n+1}$, and polymetaphosphoric acids which are produced by cyclic condensation of orthophosphoric acid and represented by formula, $(HPO_3)_n$. Of these poly-acids, the condensed phosphoric acids having 2 to 20 phosphorus atoms per molecule are used to advantage in the present invention. In particular, those having 2 to 10 phosphorus atoms can produce better results. When the alloy powder is treated with a solution of orthophosphoric acid ($H_3PO_4$), the initial activity can be somewhat improved, but the treated alloy becomes liable to be oxidized to result in deterioration of storage characteristics and difficulty in handling, and further a drop in the capacity achieved. When the number of phosphorus atoms in a poly-acid used is greater than 20, on the other hand, the hydrogen absorbing-desorbing reaction is suppressed by the poly-acid used to result in a decrease of hydrogen storage capacity.

In the present invention, such condensed phosphoric acids can be used alone or as a mixture of two or more thereof, or phytic acid can be used together with those condensed phosphoric acids or in place of them.

As for the solvent used for dissolving phytic acid, water, an alcohol (preferably having 1 to 5 carbon atoms), an aromatic hydrocarbon (e.g., toluene) and a ketone (e.g., acetone) are examples thereof. Also, mixed solvents (such as a water-alcohol mixture and an acetone-toluene mixture) may be used.

Further, it is preferable in the present invention that a pretreatment with a solution of mineral acid or alkali be performed prior to the treatment with a solution comprising the aforementioned condensed phosphoric acid(s) and/or phytic acid.

The concentration of a mineral acid used for the pretreatment can be chosen properly. More specifically, it is desirable that the mineral acid concentration be adjusted to 0.05–1.0 N, preferably 0.1–0.5 N. When the acid concentration is lower than 0.05 N, the alloy particle surface cannot experience sufficient pretreatment effect; as a result, the activation effect of the acid cannot be produced. When the acid concentration is higher than 1.0 N, on the other hand, the pretreatment proceeds to the interior of the alloy particles, and thereby the hydrogen storage capacity of the treated alloy tends to be decreased.

The mineral acid used in the present invention is not limited to any particular ones, but it can be selected properly from known mineral acids. Preferably, the mineral acid comprising at least hydrochloric acid, sulfuric acid or nitric acid is used.

After the pretreatment with a mineral acid, the alloy powder is washed with water, if needed, and then subjected to the treatment with a solution comprising a condensed phosphoric acid and/or phytic acid.

The suitable temperature in the pretreatment with a mineral acid is from room temperature to 130°. The pretreatment under heating or cooling is undesirable in view of economy, because it causes a decrease of productivity and entails a high cost for the production in an industrial scale. In particular, the pretreatment carried out while cooling is impractical, because the pretreatment time becomes too long. Also, the pretreatment at a temperature higher than 130° C. is undesirable, because the pretreatment proceeds to the interior of the alloy powder, thereby decreasing the hydrogen storage capacity.

When the pretreatment is carried out with an alkali in the present invention, the alkali has no particular restriction, but it can be selected properly from known alkalis. Specifically, the alkali comprising at least lithium hydroxide, sodium hydroxide or potassium hydroxide is used to advantage. In particular, lithium hydroxide is preferred over the others.

After the pretreatment with an alkali, it is desirable that the alkali-treated alloy be neutralized prior to the present treatment with a condensed phosphoric acid and/or phytic acid.

For neutralizing the alkali-treated alloy, any of conventional mineral acids can be used. Preferably, hydrochloric acid, sulfuric acid, nitric acid or a mixture of two or more thereof is employed.

The alkali concentration in the pretreatment can be chosen properly. More specifically, it is desirable that the alkali concentration be adjusted to 1.0–10.0 N, preferably 3.0–6.0 N. When the concentration is lower than 1.0 N. the alloy particle surface cannot experience sufficient pretreatment effect; as a result, the activation effect of the alkali cannot be produced. When the concentration is higher than 10.0 N, on the other hand, the pretreatment proceeds to the interior of the alloy particles, and thereby the hydrogen storage capacity of the treated alloy is decreased.

The suitable temperature in the pretreatment with an alkali is from room temperature to 150° C. The pretreatment performed under a high temperature or while cooling is undesirable in view of economy because it lowers industrial productivity. More specifically, the pretreatment carried out while cooling requires too long a time, and the pretreatment at a temperature higher than 150° C. is also undesirable because the pretreatment proceeds to the interior of the alloy powder, thereby decreasing the hydrogen storage capacity.

As for the pretreatment time, the range of 0.1 to 10 hours is appropriate in the case of using a mineral acid as well as the case of using an alkali. The time for the pretreatment can be adjusted properly depending on the pretreatment temperature. In other words, the pretreatment time is shortened when the temperature is high; while it is lengthened when the temperature is low. Also, the pretreatment may be carried out under a pressure of 10 kgf/cm$^2$ or below in an airtight vessel, if needed.

The present invention has no particular restriction as to the way of the treating a hydrogen absorbing alloy, but any of known ways, e.g., immersing a hydrogen absorbing alloy in a treating solution, can be adopted. For effectively achieving the treatment, it is desirable that, prior to the immersion, the hydrogen absorbing alloy be ground to a powder. Preferably, the agitation is carried out during the immersion, and thereby the initial activity of the electrode using the thus treated alloy powder can be further elevated.

When the hydrogen absorbing alloy powder treated in accordance with the present method is applied to the negative electrode of a nickel-hydrogen secondary battery, the initial activity of the secondary battery undergoes a significant improvement. As a reason for this improvement, it can be presumed that the hydrogen alloy surface is covered by phosphorus compounds adsorbed thereon by undergoing the treatment with a condensed phosphoric acid and/or phytic acid after the pretreatment with a mineral acid or alkali.

The hydrogen absorbing alloy powder according to the present invention can be easily prepared in the following manner; A hydrogen absorbing alloy produced by fusing a metallic mixture having the composition as mentioned hereinbefore by means of, e.g., a known high frequency induction furnace is ground to a powder, and this powder is treated with a mineral acid or alkali, if desired, washed or neutralized, if needed, and immersed in a solution comprising a condensed phosphoric acid and/or phytic acid, and further washed, if desired, and dried.

In the present invention, the thus obtained alloy powder is kneaded with a binder, such as PVA, a cellulose derivative, PTFE or polyethylene oxide, to make a paste, and this paste is filled into a three-dimensional conductive support, such as textile Ni or foamed Ni, or a two-dimensional conductive support such as a punching metal, and then pressed, thereby preparing a negative electrode.

In accordance with the present method, a hydrogen absorbing alloy powder having not only high activity but also excellent keeping quality and easiness of handling can be obtained with great ease. Further, the use of the hydrogen absorbing alloy powder obtained in accordance with the present method can ensure excellent initial activity in the negative electrode of a nickel-hydrogen secondary battery.

The present invention will now be illustrated in greater detail by reference to the following examples. However, the invention should not be construed as being limited to these examples.

EXAMPLES AND COMPARATIVE EXAMPLES

The metallic elements Mm, Al, Co Mn and Ni were weighed out in the atomic ratio of 1.00:0.30:0.75:0.20:3.75. The metallic element Mm used herein was a Mish metal constituted of 61 weight % of La, 7 weight % of Ce, 23 weight % of Pr and 9 weight % of Nd. These elements were fused under an atmosphere of argon by means of a high frequency induction furnace to give a hydrogen absorbing alloy ingot. This ingot was subjected to a heat treatment at 1020° C., and then ground to a fine powder having an average particle size of 32 µm.

Various treating solutions were prepared using the condensed phosphoric acids set forth in Table 1 or phytic acid respectively. Herein, the concentration of each treating solution was chosen from the range of 0.01 to 30 weight %.

The alloy powder obtained in the foregoing manner and each of those treating solutions were mixed in a proportion of 2 kg to 1 liter with stirring. The resulting mixture was filtered off, and then dried. Each of the thus treated powders was used for an electrode of the secondary battery described below. The characteristics of these secondary batteries were examined using the method mentioned below, and thereby the electrode performance and the treated alloy powder quality were evaluated. The evaluation results are shown in Tables 1 and 2.

In addition to the foregoing experiments, other experiments were carried out, wherein the alloy powder was pretreated with a mineral acid solution having its concentration in the range of 0.01 to 1.5 N, and then treated with the aforementioned treating solutions respectively. The thus treated alloy powders were evaluated in the same way as described above. These evaluation results are shown in Tables 3 and 6. Further, the same experiments as the above, except that the alloy powder was pretreated with an alkali solution having its concentration in the range of 0.1 to 12 N in place of an mineral acid solution, were carried out, and the alloy powders thus treated were evaluated in the same way as described above. The evaluation results obtained are shown in Tables 7 to 10.

Making Secondary Battery

The treated powder in an amount of 2 g was mixed with 0.5 g of a 3 weight % solution of polyvinyl alcohol (average polymerization degree: 2,000) to prepare a paste. This paste was applied to a textile Ni support, dried, and then subjected to pressure molding to form into a negative electrode having a thickness of 0.5 mm. Further, a sintered nickel prepared by a conventional method was used as a nickel oxide positive electrode, a nonwoven fabric of polypropylene was used as a separator, and a 6N aqueous solution of KOH was used as an electrolytic solution. These were combined with the foregoing negative electrode to make an negative electrode-regulated open-type nickel-hydrogen secondary battery.

Evaluation of Initial Activity and Initial Capacity

The thus made battery was charged for 5 hours by sending thereto an electric current of 180 mA at a temperature regulated at 20° C., and then made to discharge an electric current of 120 mA until the battery voltage was dropped to 1.0 V. This charge-discharge cycle operation was repeated for 10 times. The initial activity was evaluated by the capacity measured at the first cycle, and the initial capacity was evaluated by the capacity measured at the tenth cycle. These results are shown in Tables 1, 3, 4, 7 and 8 together with the conditions employed in each treatment.

Evaluation of Storage Characteristics

Secondary batteries were made in the same manner as described above, except that the alloy powders treated as shown in Tables 1, 3, 4, 7 and 8 were used respectively after two months' storage, and their initial activities and initial capacities were evaluated by the same procedures as described above. The evaluation results are shown in Tables 2, 5, 6, 9 and 10.

In Tables 1 to 10, Experiment No. to which the mark * is attached corresponds to Comparative Example. The symbols used therein stand for the following compounds respectively:

$P_n$: Condensed phosphoric acid of formula $H_{n+2}P_nO_{3n+1}$ (which is symbolized by the number of phosphorus atoms therein).

F: Methanol solution of phytic acid

C: Hydrochloric acid
N: Nitric acid
S: Sulfuric acid
K: KOH
N: NaOH
L: LiOH
K/L: KOH/LiOH=9/1

TABLE 1

| Experiment No. | Treating agent ($P_n$) | Treating agent concentration (wt %) | Treatment temperature (° C.) | Treatment time (min) | 1st-cycle capacity (mAh/g) | 10th-cycle capacity (mAh/g) |
| --- | --- | --- | --- | --- | --- | --- |
| 0* | none | 0 | — | — | 204 | 291 |
| 1* | P1 | 0.5 | 60 | 60 | 210 | 294 |
| 2 | P2 | 0.5 | 20 | 60 | 228 | 314 |
| 3 | P2 | 0.5 | 60 | 60 | 230 | 318 |
| 4 | P2 | 0.5 | 100 | 60 | 222 | 312 |
| 5 | P2 | 0.5 | 120 | 60 | 208 | 292 |
| 6 | P4 | 0.005 | 60 | 60 | 209 | 291 |
| 7 | P4 | 0.01 | 60 | 60 | 221 | 313 |
| 8 | P4 | 0.5 | 60 | 60 | 236 | 320 |
| 9 | P4 | 10 | 60 | 60 | 225 | 318 |
| 10 | P4 | 15 | 60 | 60 | 207 | 293 |
| 11 | P4 | 0.5 | 60 | 3 | 210 | 294 |
| 12 | P4 | 0.5 | 60 | 10 | 226 | 317 |
| 13 | P4 | 0.5 | 60 | 300 | 232 | 316 |
| 14 | P4 | 0.5 | 60 | 600 | 229 | 315 |
| 15 | P4 | 0.5 | 60 | 900 | 208 | 296 |
| 16 | P10 | 0.5 | 60 | 60 | 227 | 315 |
| 17 | P20 | 0.5 | 60 | 60 | 224 | 314 |
| 18 | F | 0.5 | 60 | 60 | 232 | 319 |
| 19* | P25 | 0.5 | 60 | 60 | 206 | 295 |

*: Comparative Examples
Treating Agent: Condensed phosphoric acid ($H_{n+2}P_nO_{3n+1}$)

TABLE 2

| Experiment No. | Treating agent ($P_n$) | Treating agent concentration (wt %) | Treatment temperature (° C.) | Treatment time (min) | 1st-cycle capacity (mAh/g) | 10th-cycle capacity (mAh/g) |
| --- | --- | --- | --- | --- | --- | --- |
| 100* | none | 0 | — | — | 161 | 282 |
| 101* | P1 | 0.5 | 60 | 60 | 191 | 284 |
| 102 | P2 | 0.5 | 20 | 60 | 228 | 316 |
| 103 | P2 | 0.5 | 60 | 60 | 229 | 319 |
| 104 | P2 | 0.5 | 100 | 60 | 219 | 314 |
| 105 | P2 | 0.5 | 120 | 60 | 198 | 284 |
| 106 | P4 | 0.005 | 60 | 60 | 167 | 282 |
| 107 | P4 | 0.01 | 60 | 60 | 216 | 311 |
| 108 | P4 | 0.5 | 60 | 60 | 235 | 320 |
| 109 | P4 | 10 | 60 | 60 | 224 | 316 |
| 110 | P4 | 15 | 60 | 60 | 202 | 281 |
| 111 | P4 | 0.5 | 60 | 3 | 178 | 281 |
| 112 | P4 | 0.5 | 60 | 10 | 222 | 315 |
| 113 | P4 | 0.5 | 60 | 300 | 230 | 316 |
| 114 | P4 | 0.5 | 60 | 600 | 230 | 314 |
| 115 | P4 | 0.5 | 60 | 900 | 204 | 278 |
| 116 | P10 | 0.5 | 60 | 60 | 228 | 315 |
| 117 | P20 | 0.5 | 60 | 60 | 218 | 313 |
| 118 | F | 0.5 | 60 | 60 | 233 | 320 |
| 119* | P25 | 0.5 | 60 | 60 | 201 | 280 |

*: Comparative Examples
Treating Agent: Condensed phosphoric acid ($H_{n+2}P_nO_{3n+1}$)

TABLE 3

| Experiment No. | Acid Treatment ||||  Treatment with Treating Agent ||||  1st-cycle capacity (mAh/g) | 10th-cycle capacity (mAh/g) |
| --- | --- | --- | --- | --- | --- | --- | --- | --- | --- | --- |
|  | Mineral acid | Mineral acid concentration (N) | Temperature (° C.) | Time (hr) | Treating agent ($P_n$) | Treating agent concentration (wt %) | Treatment temperature (° C.) | Treatment time (min) | | |
| 0* | — | none | — | — | none | 0 | — | — | 204 | 291 |
| A-1-1 | — | none | — | — | P2 | 0.5 | 60 | 60 | 230 | 318 |
| A-1-2* | C | 0.15 | 60 | 0.5 | none | 0 | — | — | 219 | 290 |
| A-2* | C | 0.15 | 60 | 0.5 | P1 | 0.5 | 60 | 60 | 219 | 289 |
| A-3 | C | 0.15 | 20 | 0.5 | P2 | 0.5 | 60 | 60 | 251 | 305 |
| A-4 | C | 0.15 | 60 | 0.5 | P2 | 0.5 | 60 | 60 | 267 | 307 |
| A-5 | C | 0.15 | 130 | 0.5 | P2 | 0.5 | 60 | 60 | 261 | 309 |
| A-6 | C | 0.15 | 150 | 0.5 | P2 | 0.5 | 60 | 60 | 220 | 281 |
| A-7 | C | 0.15 | 60 | 0.5 | P4 | 0.5 | 20 | 60 | 264 | 308 |
| A-8 | C | 0.15 | 60 | 0.5 | P4 | 0.5 | 60 | 60 | 269 | 310 |
| A-9 | C | 0.15 | 60 | 0.5 | P4 | 0.5 | 130 | 60 | 254 | 306 |
| A-10 | C | 0.15 | 60 | 0.5 | P4 | 0.5 | 150 | 60 | 219 | 285 |
| A-11 | C | 0.01 | 60 | 0.5 | P4 | 0.5 | 60 | 60 | 207 | 280 |
| A-12 | C | 0.05 | 60 | 0.5 | P4 | 0.5 | 60 | 60 | 252 | 301 |
| A-13 | C | 0.5 | 60 | 0.5 | P4 | 0.5 | 60 | 60 | 268 | 307 |
| A-14 | C | 1 | 60 | 0.5 | P4 | 0.5 | 60 | 60 | 262 | 300 |
| A-15 | C | 1.5 | 60 | 0.5 | P4 | 0.5 | 60 | 60 | 218 | 268 |
| A-16 | N | 0.15 | 60 | 0.5 | P4 | 0.5 | 60 | 60 | 255 | 301 |
| A-17 | S | 0.15 | 60 | 0.5 | P4 | 0.5 | 60 | 60 | 262 | 307 |

*: Comparative Examples
Treating Agent: Condensed phosphoric acid ($H_{n+2}P_nO_{3n+1}$)

TABLE 4

| Experiment No. | Acid Treatment |||| Treatment with Treating Agent |||| 1st-cycle capacity (mAh/g) | 10th-cycle capacity (mAh/g) |
| --- | --- | --- | --- | --- | --- | --- | --- | --- | --- | --- |
|  | Mineral acid | Mineral acid concentration (N) | Temperature (° C.) | Time (hr) | Treating agent ($P_n$) | Treating agent concentration (wt %) | Treatment temperature (° C.) | Treatment time (min) | | |
| A-18 | C | 0.15 | 60 | 0.05 | P10 | 0.5 | 60 | 60 | 218 | 279 |
| A-19 | C | 0.15 | 60 | 0.1 | P10 | 0.5 | 60 | 60 | 257 | 306 |
| A-20 | C | 0.15 | 60 | 0.5 | P10 | 0.5 | 60 | 60 | 260 | 308 |
| A-21 | C | 0.15 | 60 | 1 | P10 | 0.5 | 60 | 60 | 258 | 307 |
| A-22 | C | 0.15 | 60 | 5 | P10 | 0.5 | 60 | 60 | 256 | 305 |
| A-23 | C | 0.15 | 60 | 10 | P10 | 0.5 | 60 | 60 | 253 | 304 |
| A-24 | C | 0.15 | 60 | 15 | P10 | 0.5 | 60 | 60 | 219 | 268 |
| A-25 | C | 0.15 | 60 | 0.5 | P20 | 0.005 | 60 | 60 | 214 | 291 |
| A-26 | C | 0.15 | 60 | 0.5 | P20 | 0.01 | 20 | 60 | 255 | 303 |
| A-27 | C | 0.15 | 60 | 0.5 | P20 | 0.5 | 60 | 60 | 258 | 310 |
| A-28 | C | 0.15 | 60 | 0.5 | P20 | 10 | 60 | 60 | 252 | 304 |
| A-29 | C | 0.15 | 60 | 0.5 | P20 | 15 | 60 | 60 | 217 | 283 |
| A-30 | C | 0.15 | 60 | 0.5 | P20 | 0.5 | 60 | 3 | 217 | 280 |
| A-31 | C | 0.15 | 60 | 0.5 | P20 | 0.5 | 60 | 10 | 256 | 306 |
| A-32 | C | 0.15 | 60 | 0.5 | P20 | 0.5 | 60 | 300 | 255 | 309 |
| A-33 | C | 0.15 | 60 | 0.5 | P20 | 0.5 | 60 | 600 | 250 | 308 |
| A-34 | C | 0.15 | 60 | 0.5 | P20 | 0.5 | 60 | 900 | 215 | 289 |
| A-35* | C | 0.15 | 60 | 0.5 | P25 | 0.5 | 60 | 60 | 211 | 282 |
| A-36 | C | 0.15 | 60 | 0.5 | F | 0.5 | 60 | 60 | 264 | 311 |

*: Comparative Example
Treating Agent: Condensed phosphoric acid ($H_{n+2}P_nO_{3n+1}$)

TABLE 5

| Experiment No. | Acid Treatment | | | | Treatment with Treating Agent | | | | 1st-cycle capacity (mAh/g) | 10th-cycle capacity (mAh/g) |
| --- | --- | --- | --- | --- | --- | --- | --- | --- | --- | --- |
| | Mineral acid | Mineral acid concentration (N) | Temperature (° C.) | Time (hr) | Treating agent ($P_n$) | Treating agent concentration (wt %) | Treatment temperature (° C.) | Treatment time (min) | | |
| A-100* | — | none | — | — | none | 0 | — | — | 161 | 282 |
| A-101-1 | — | none | — | — | P2 | 0.5 | 60 | 60 | 229 | 319 |
| A-101-2* | C | 0.15 | 60 | 0.5 | none | 0 | — | — | 145 | 281 |
| A-102* | C | 0.15 | 60 | 0.5 | P1 | 0.5 | 60 | 60 | 152 | 279 |
| A-103 | C | 0.15 | 20 | 0.5 | P2 | 0.5 | 60 | 60 | 250 | 305 |
| A-104 | C | 0.15 | 60 | 0.5 | P2 | 0.5 | 60 | 60 | 267 | 308 |
| A-105 | C | 0.15 | 130 | 0.5 | P2 | 0.5 | 60 | 60 | 259 | 307 |
| A-106 | C | 0.15 | 150 | 0.5 | P2 | 0.5 | 60 | 60 | 170 | 269 |
| A-107 | C | 0.15 | 60 | 0.5 | P4 | 0.5 | 20 | 60 | 262 | 306 |
| A-108 | C | 0.15 | 60 | 0.5 | P4 | 0.5 | 60 | 60 | 268 | 310 |
| A-109 | C | 0.15 | 60 | 0.5 | P4 | 0.5 | 130 | 60 | 254 | 305 |
| A-110 | C | 0.15 | 60 | 0.5 | P4 | 0.5 | 150 | 60 | 201 | 280 |
| A-111 | C | 0.01 | 60 | 0.5 | P4 | 0.5 | 60 | 60 | 205 | 275 |
| A-112 | C | 0.05 | 60 | 0.5 | P4 | 0.5 | 60 | 60 | 253 | 302 |
| A-113 | C | 0.5 | 60 | 0.5 | P4 | 0.5 | 60 | 60 | 265 | 305 |
| A-114 | C | 1 | 60 | 0.5 | P4 | 0.5 | 60 | 60 | 258 | 300 |
| A-115 | C | 1.5 | 60 | 0.5 | P4 | 0.5 | 60 | 60 | 177 | 259 |
| A-116 | N | 0.15 | 60 | 0.5 | P4 | 0.5 | 60 | 60 | 254 | 300 |
| A-117 | S | 0.15 | 60 | 0.5 | P4 | 0.5 | 60 | 60 | 260 | 305 |

*: Comparative Examples
Treating Agent: Condensed phosphoric acid ($H_{n+2}P_nO_{3n+1}$)

TABLE 6

| Experiment No. | Acid Treatment | | | | Treatment with Treating Agent | | | | 1st-cycle capacity (mAh/g) | 10th-cycle capacity (mAh/g) |
| --- | --- | --- | --- | --- | --- | --- | --- | --- | --- | --- |
| | Mineral acid | Mineral acid concentration (N) | Temperature (° C.) | Time (hr) | Treating agent ($P_n$) | Treating agent concentration (wt %) | Treatment temperature (° C.) | Treatment time (min) | | |
| A-118 | C | 0.15 | 60 | 0.05 | P10 | 0.5 | 60 | 60 | 200 | 270 |
| A-119 | C | 0.15 | 60 | 0.1 | P10 | 0.5 | 60 | 60 | 257 | 305 |
| A-120 | C | 0.15 | 60 | 0.5 | P10 | 0.5 | 60 | 60 | 261 | 308 |
| A-121 | C | 0.15 | 60 | 1 | P10 | 0.5 | 60 | 60 | 256 | 306 |
| A-122 | C | 0.15 | 60 | 5 | P10 | 0.5 | 60 | 60 | 256 | 304 |
| A-123 | C | 0.15 | 60 | 10 | P10 | 0.5 | 60 | 60 | 251 | 302 |
| A-124 | C | 0.15 | 60 | 15 | P10 | 0.5 | 60 | 60 | 209 | 267 |
| A-125 | C | 0.15 | 60 | 0.5 | P20 | 0.005 | 60 | 60 | 192 | 279 |
| A-126 | C | 0.15 | 60 | 0.5 | P20 | 0.01 | 60 | 60 | 252 | 301 |
| A-127 | C | 0.15 | 60 | 0.5 | P20 | 0.5 | 60 | 60 | 259 | 310 |
| A-128 | C | 0.15 | 60 | 0.5 | P20 | 10 | 60 | 60 | 253 | 303 |
| A-129 | C | 0.15 | 60 | 0.5 | P20 | 15 | 60 | 60 | 215 | 273 |
| A-130 | C | 0.15 | 60 | 0.5 | P20 | 0.5 | 60 | 3 | 199 | 273 |
| A-131 | C | 0.15 | 60 | 0.5 | P20 | 0.5 | 60 | 10 | 253 | 304 |
| A-132 | C | 0.15 | 60 | 0.5 | P20 | 0.5 | 60 | 300 | 255 | 306 |
| A-133 | C | 0.15 | 60 | 0.5 | P20 | 0.5 | 60 | 600 | 250 | 306 |
| A-134 | C | 0.15 | 60 | 0.5 | P20 | 0.5 | 60 | 900 | 214 | 285 |
| A-135* | C | 0.15 | 60 | 0.5 | P25 | 0.5 | 60 | 60 | 211 | 263 |
| A-136 | C | 0.15 | 60 | 0.5 | F | 0.5 | 60 | 60 | 263 | 310 |

*: Comparative Example
Treating Agent: Condensed phosphoric acid ($H_{n+2}P_nO_{3n+1}$)

TABLE 7

| Experiment No. | Alkali Treatment | | | | Treatment with Treating Agent | | | | 1st-cycle capacity (mAh/g) | 10th-cycle capacity (mAh/g) |
| --- | --- | --- | --- | --- | --- | --- | --- | --- | --- | --- |
| | Alkali | Alkali concentration (N) | Temperature (° C.) | Time (hr) | Treating agent ($P_n$) | Treating agent concentration (wt %) | Treatment temperature (° C.) | Treatment time (min) | | |
| 0* | — | none | — | — | none | 0 | — | — | 204 | 291 |
| B-1-1 | — | none | — | — | P2 | 0.5 | 60 | 60 | 230 | 318 |
| B-1-2* | K | 6 | 110 | 5 | none | 0 | — | — | 218 | 289 |
| B-2* | K | 6 | 110 | 5 | P1 | 0.5 | 60 | 60 | 217 | 288 |
| B-3 | K | 6 | 20 | 5 | P2 | 0.5 | 60 | 60 | 252 | 300 |
| B-4 | K | 6 | 60 | 5 | P2 | 0.5 | 60 | 60 | 260 | 302 |
| B-5 | K | 6 | 110 | 5 | P2 | 0.5 | 60 | 60 | 263 | 305 |
| B-6 | K | 6 | 150 | 5 | P2 | 0.5 | 60 | 60 | 264 | 306 |
| B-7 | K | 6 | 180 | 5 | P2 | 0.5 | 60 | 60 | 211 | 285 |
| B-8 | K | 6 | 110 | 5 | P4 | 0.5 | 20 | 60 | 259 | 305 |
| B-9 | K | 6 | 110 | 5 | P4 | 0.5 | 130 | 60 | 260 | 303 |
| B-10 | K | 6 | 110 | 5 | P4 | 0.5 | 150 | 60 | 218 | 284 |
| B-11 | K | 0.1 | 110 | 5 | P4 | 0.5 | 60 | 60 | 207 | 279 |
| B-12 | K | 1 | 110 | 5 | P4 | 0.5 | 60 | 60 | 251 | 303 |
| B-13 | K | 3 | 110 | 5 | P4 | 0.5 | 60 | 60 | 256 | 306 |
| B-14 | K | 6 | 110 | 5 | P4 | 0.5 | 60 | 60 | 261 | 308 |
| B-15 | K | 10 | 110 | 5 | P4 | 0.5 | 60 | 60 | 264 | 308 |
| B-16 | K | 12 | 110 | 5 | P4 | 0.5 | 60 | 60 | 221 | 279 |
| B-17 | N | 6 | 110 | 5 | P4 | 0.5 | 60 | 60 | 258 | 301 |
| B-18 | L | 6 | 110 | 5 | P4 | 0.5 | 60 | 60 | 250 | 300 |
| B-19 | K/L | 6 | 110 | 5 | P4 | 0.5 | 60 | 60 | 266 | 308 |

*: Comparative Examples
Treating Agent: Condensed phosphoric acid ($H_{n+2}P_nO_{3n+1}$)

TABLE 8

| Experiment No. | Alkali Treatment | | | | Treatment with Treating Agent | | | | 1st-cycle capacity (mAh/g) | 10th-cycle capacity (mAh/g) |
| --- | --- | --- | --- | --- | --- | --- | --- | --- | --- | --- |
| | Alkali | Alkali concentration (N) | Temperature (° C.) | Time (min) | Treating agent ($P_n$) | Treating agent concentration (wt %) | Treatment temperature (° C.) | Treatment time (min) | | |
| B-20 | K | 6 | 110 | 3 | P10 | 0.5 | 60 | 60 | 200 | 277 |
| B-21 | K | 6 | 110 | 10 | P10 | 0.5 | 60 | 60 | 250 | 301 |
| B-22 | K | 6 | 110 | 60 | P10 | 0.5 | 60 | 60 | 252 | 303 |
| B-23 | K | 6 | 110 | 300 | P10 | 0.5 | 60 | 60 | 258 | 305 |
| B-24 | K | 6 | 110 | 600 | P10 | 0.5 | 60 | 60 | 260 | 306 |
| B-25 | K | 6 | 110 | 900 | P10 | 0.5 | 60 | 60 | 212 | 286 |
| B-26 | K | 6 | 110 | 300 | P20 | 0.005 | 60 | 60 | 218 | 288 |
| B-27 | K | 6 | 110 | 300 | P20 | 0.01 | 60 | 60 | 252 | 300 |
| B-28 | K | 6 | 110 | 300 | P20 | 0.5 | 60 | 60 | 260 | 302 |
| B-29 | K | 6 | 110 | 300 | P20 | 10 | 60 | 60 | 261 | 304 |
| B-30 | K | 6 | 110 | 300 | P20 | 15 | 60 | 60 | 221 | 284 |
| B-31 | K | 6 | 110 | 300 | P20 | 0.5 | 60 | 3 | 218 | 281 |
| B-32 | K | 6 | 110 | 300 | P20 | 0.5 | 60 | 10 | 259 | 301 |
| B-33 | K | 6 | 110 | 300 | P20 | 0.5 | 60 | 300 | 261 | 304 |
| B-34 | K | 6 | 110 | 300 | P20 | 0.5 | 60 | 600 | 258 | 305 |
| B-35 | K | 6 | 110 | 300 | P20 | 0.5 | 60 | 900 | 220 | 288 |
| B-36* | K | 6 | 110 | 300 | P25 | 0.5 | 60 | 60 | 218 | 278 |
| B-37 | K | 6 | 110 | 300 | F | 0.5 | 60 | 60 | 268 | 307 |

*: Comparative Examples
Treating Agent: Condensed phosphoric acid ($H_{n+2}P_nO_{3n+1}$)

TABLE 9

| Experiment No. | Alkali Treatment | | | | Treatment with Treating Agent | | | | 1st-cycle capacity (mAh/g) | 10th-cycle capacity (mAh/g) |
| --- | --- | --- | --- | --- | --- | --- | --- | --- | --- | --- |
| | Alkali | Alkali concentration (N) | Temperature (° C.) | Time (hr) | Treating agent ($P_n$) | Treating agent concentration (wt %) | Treatment temperature (° C.) | Treatment time (min) | | |
| B-100* | — | none | — | — | none | 0 | — | — | 161 | 282 |
| B-101-1 | — | none | — | — | P2 | 0.5 | 60 | 60 | 229 | 319 |
| B-101-2* | K | 6 | 110 | 5 | none | 0 | — | — | 143 | 279 |
| B-102* | K | 6 | 110 | 5 | P1 | 0.5 | 60 | 60 | 207 | 276 |
| B-103 | K | 6 | 20 | 5 | P2 | 0.5 | 60 | 60 | 252 | 300 |
| B-104 | K | 6 | 60 | 5 | P2 | 0.5 | 60 | 60 | 259 | 301 |
| B-105 | K | 6 | 110 | 5 | P2 | 0.5 | 60 | 60 | 262 | 305 |
| B-106 | K | 6 | 150 | 5 | P2 | 0.5 | 60 | 60 | 260 | 303 |
| B-107 | K | 6 | 180 | 5 | P2 | 0.5 | 60 | 60 | 209 | 278 |
| B-108 | K | 6 | 110 | 5 | P4 | 0.5 | 20 | 60 | 256 | 303 |
| B-109 | K | 6 | 110 | 5 | P4 | 0.5 | 130 | 60 | 260 | 302 |
| B-110 | K | 6 | 110 | 5 | P4 | 0.5 | 150 | 60 | 211 | 279 |
| B-111 | K | 0.1 | 110 | 5 | P4 | 0.5 | 60 | 60 | 207 | 277 |
| B-112 | K | 1 | 110 | 5 | P4 | 0.5 | 60 | 60 | 251 | 303 |
| B-113 | K | 3 | 110 | 5 | P4 | 0.5 | 60 | 60 | 255 | 305 |
| B-114 | K | 6 | 110 | 5 | P4 | 0.5 | 60 | 60 | 261 | 307 |
| B-115 | K | 10 | 110 | 5 | P4 | 0.5 | 60 | 60 | 263 | 305 |
| B-116 | K | 12 | 110 | 5 | P4 | 0.5 | 60 | 60 | 217 | 276 |
| B-117 | N | 6 | 110 | 5 | P4 | 0.5 | 60 | 60 | 254 | 301 |
| B-118 | L | 6 | 110 | 5 | P4 | 0.5 | 60 | 60 | 250 | 301 |
| B-119 | K/L | 6 | 110 | 5 | P4 | 0.5 | 60 | 60 | 266 | 309 |

*: Comparative Examples
Treating Agent: Condensed phosphoric acid ($H_{n+2}P_nO_{3n+1}$)

TABLE 10

| Experiment No. | Alkali Treatment | | | | Treatment with Treating Agent | | | | 1st-cycle capacity (mAh/g) | 10th-cycle capacity (mAh/g) |
| --- | --- | --- | --- | --- | --- | --- | --- | --- | --- | --- |
| | Alkali | Alkali concentration (N) | Temperature (° C.) | Time (min) | Treating agent ($P_n$) | Treating agent concentration (wt %) | Treatment temperature (° C.) | Treatment time (min) | | |
| B-120 | K | 6 | 110 | 3 | P10 | 0.5 | 60 | 60 | 198 | 270 |
| B-121 | K | 6 | 110 | 10 | P10 | 0.5 | 60 | 60 | 250 | 301 |
| B-122 | K | 6 | 110 | 60 | P10 | 0.5 | 60 | 60 | 252 | 303 |
| B-123 | K | 6 | 110 | 300 | P10 | 0.5 | 60 | 60 | 259 | 305 |
| B-124 | K | 6 | 110 | 600 | P10 | 0.5 | 60 | 60 | 258 | 304 |
| B-125 | K | 6 | 110 | 900 | P10 | 0.5 | 60 | 60 | 212 | 283 |
| B-126 | K | 6 | 110 | 300 | P20 | 0.005 | 60 | 60 | 178 | 273 |
| B-127 | K | 6 | 110 | 300 | P20 | 0.01 | 60 | 60 | 251 | 300 |
| B-128 | K | 6 | 110 | 300 | P20 | 0.5 | 60 | 60 | 260 | 302 |
| B-129 | K | 6 | 110 | 300 | P20 | 10 | 60 | 60 | 261 | 304 |
| B-130 | K | 6 | 110 | 300 | P20 | 15 | 60 | 60 | 220 | 282 |
| B-131 | K | 6 | 110 | 300 | P20 | 0.5 | 60 | 3 | 185 | 281 |
| B-132 | K | 6 | 110 | 300 | P20 | 0.5 | 60 | 10 | 257 | 301 |
| B-133 | K | 6 | 110 | 300 | P20 | 0.5 | 60 | 300 | 261 | 305 |
| B-134 | K | 6 | 110 | 300 | P20 | 0.5 | 60 | 600 | 258 | 306 |
| B-135 | K | 6 | 110 | 300 | P20 | 0.5 | 60 | 900 | 218 | 282 |
| B-136* | K | 6 | 110 | 300 | P25 | 0.5 | 60 | 60 | 218 | 271 |
| B-137 | K | 6 | 110 | 300 | F | 0.5 | 60 | 60 | 269 | 308 |

*: Comparative Example
Treating Agent: Condensed phosphoric acid ($H_{n+2}P_nO_{3n+1}$)

As is apparent from the results shown in Table 1 (specifically, by making comparisons between Comparative Examples (e.g., Experiment No. 0) and the present Examples e.g., Experiment Nos. 2, 8, 17 and 18), the initial activity of the secondary battery was elevated by the treatment according to the present invention. Further, the results of Experimental Nos. 1 to 19 demonstrate that the expected effects were fully achieved by using as a treating agent a condensed phosphoric acid having 2 to 20 phosphorus atoms or phytic acid. Furthermore, it was confirmed by the results of Experiment Nos. 6 to 10 that the condensed phosphoric acid had a beneficial effect when the concentration thereof was in the range of about 0.01 to 10 weight % and the effect produced thereby was maximal in the concentration range of about 0.1 to 1 weight %.

As for the treatment temperature, it was confirmed by the results of Experiment Nos. 2 to 5 that the treatment effect was lessened when the treatment was carried out at a temperature higher than 100° C. As a cause thereof, it is assumed that the alloy surface is oxidized during the treatment at such a high temperature.

Moreover, the comparisons between the data set forth in Table 1 and those set forth in Table 2 prove that the drops in initial activity and initial capacity due to the use of the stored alloy powders were decidedly small in the experiments according to the present invention, compared with those in the comparative experiments. These results indicate that the alloy powder treated in accordance with the present invention had excellent storage stability.

From the results shown in Tables 3 and 4 (specifically, by making comparisons between Comparative Examples (Experiment Nos. 0, A-2 and A-35) and the present Examples (e.g., Experiment Nos., A-4, A-8, A-20, A-27 and A-36), it is also apparent that not only the initial activity but also the initial capacity were elevated by the treatment according to the present invention. In particular, the results of Experiment Nos. A-11 to A-15 indicate that the expected effects were fully achieved in the case where the pulverized alloy was treated in advance with a 0.05–1 N mineral acid and then with a solution of condensed phosphoric acid or phytic acid. Further, it was confirmed by the results of Experiments No. A-3 to A-6 that the discharge capacity was lowered when the pretreatment with a mineral acid was carried out at a temperature higher than 130° C. In addition, it was confirmed by the results of Experiment Nos. A-8, A-16 and A-17 that similar elevation effects were produced by using as the mineral acid not only hydrochloric acid but also nitric acid or sulfuric acid.

Furthermore, it is seen from the results of Experimental Nos. A-25 to A-29 that the present condensed phosphoric acid or phytic acid had satisfactory effects when it was used in a proportion of 0.01 to 10 weight %, and the optimum effects were accomplished when the proportion was in the range of 0.1 to 1 weight %. As for the treatment temperature, it was confirmed by the results of Experiment Nos. A-7 to A-10 that the treatment effects were lessened when the treatment was carried out at a temperature higher than 130° C.

With respect to the keeping quality of the hydrogen absorbing powder, it was confirmed by the comparisons between the data set forth in Tables 3 and 4 and the data set forth in Tables 5 and 6 that, in contrast to the hydrogen alloy powder untreated or undergone a treatment other than those according to the present invention, the hydrogen alloy powder undergone the pretreatment with an acid and the treatment with a condensed phosphoric acid or phytic acid caused only a slight or no decrease in the initial activity and the initial capacity even when it was used after a long-range storage. These results indicate that the alloy powder treated in accordance with the present invention had excellent storage stability.

From the results shown in Tables 7 and 8 (specifically, by making comparisons between Comparative Examples (Experiment Nos. 0, B-1-2, B-2 and B-36) and the present Examples (e.g., Experiment Nos. B-5, B-14, B-23, B-28 and B-33), it is also apparent that the treatment according to the present invention was successful in elevating not only the initial activity but also the initial capacity. In particular, the results of Experiment Nos. B-11 to B-16 indicate that the expected effects were fully achieved in the case where the pulverized alloy was treated in advance with a 1–10 N alkali and then with a solution of condensed phosphoric acid or phytic acid. Further, it was confirmed by the results of Experiments No. B-3 to B-7 that the discharge capacity was lowered when the pretreatment with an alkali was carried out at a temperature higher than 150° C. In addition, it was confirmed by the results of Experiment Nos. B-14, B-17 and B-19 that potassium hydroxide, sodium hydroxide, lithium hydroxide and mixtures thereof were effectively used in the pretreatment.

Furthermore, it is seen from the results of Experimental Nos. B-26 to B-30 that the present condensed phosphoric acid or phytic acid had satisfactory effects when it was used in a proportion of 0.01 to 10 weight %, and the optimum effects were accomplished when the proportion was in the range of 0.1 to 1 weight %. As for the treatment temperature, it was confirmed by the results of Experiment Nos. B-8 to B-10 and B-14 that the treatment effects were lessened when the treatment was carried out at a temperature higher than 130° C.

With respect to the keeping quality of the hydrogen absorbing powder, it was confirmed by the comparisons between the data set forth in Tables 7 and 8 and the data set forth in Tables 9 and 10 that, in contrast to the hydrogen alloy powder untreated or undergone a treatment other than those according to the present invention, the hydrogen alloy powder undergone the pretreatment with an alkali and the treatment with a condensed phosphoric acid or phytic acid caused only a slight or no decrease in the initial activity and the initial capacity even when it was used after a long-range storage. These results indicate that the alloy powder treated in accordance with the present invention had excellent storage stability.

As demonstrated above, the treatment according to the present invention enables a hydrogen absorbing alloy powder to have high activity and satisfactory storage characteristics, and the negative electrode using the thus treated alloy powder can ensure high initial activity in the nickel-hydrogen secondary battery.

What is claimed is:

1. A method of producing a hydrogen absorbing alloy powder, comprising treating a pulverized hydrogen absorbing alloy with a solution comprising an acid selected from the group consisting of a condensed phosphoric acid having 2 to 20 phosphorus atoms, phytic acid and mixtures thereof.

2. A method of producing a hydrogen absorbing alloy powder in accordance with claim 1, wherein the acid is a condensed phosphoric acid which is a polyphosphoric acid represented by formula $H_{n+2}P_nO_{3n+1}$ or a polymetaphosphoric acid represented by formula $(HPO_3)_n$ wherein n is an integer of 2 to 20.

3. A method of producing a hydrogen absorbing alloy powder in accordance with claim 2, wherein the integer n in the formulae representing the polyphosphoric acid and the polymetaphosphoric acid respectively is from 2 to 10.

4. A method of producing a hydrogen absorbing alloy powder in accordance with claim 1, wherein the condensed phosphoric acid, phytic acid or the mixture thereof is used in an amount of 0.01 to 10 parts by weight per 100 parts by weight of the pulverized hydrogen absorbing alloy.

5. A method of producing a hydrogen absorbing alloy powder in accordance with claim 1, wherein said treating is carried out at a temperature of from room temperature to 130° C.

6. A method of producing a hydrogen absorbing alloy powder in accordance with claim 1, wherein the pulverized hydrogen absorbing alloy has a composition represented by $(La)_xR_{1-x}(Ni_aM_b)$ wherein R is at least one rare earth element selected from a group consisting of Ce, Pr and Nd, M is at least one metallic element selected from a group consisting of Mn, Al, Co, Ti, Fe, Cu and Zr, x is from 0.2 to 1, a+b is from 4.0 to 6.0 and $0<b\leq2.0$.

7. A method of producing a hydrogen absorbing alloy powder comprising pre-treating a pulverized hydrogen absorbing alloy with a mineral acid or an alkali followed by treating the pulverized hydrogen absorbing alloy with a solution comprising an acid selected from the group consisting of a condensed phosphoric acid having 2 to 20 phosphorus atoms, phytic acid and mixtures thereof.

8. A method of producing a hydrogen absorbing alloy powder in accordance with claim 7, wherein the pre-treating is with a mineral acid selected from the group consisting of hydrochloric acid, sulfuric acid and nitric acid.

9. A method of producing a hydrogen absorbing alloy powder in accordance with claim 7, wherein the pretreating is with a mineral acid at a concentration from 0.05 N to 1.0 N.

10. A method of producing a hydrogen absorbing alloy powder in accordance with claim 7, wherein the pre-treating is with a mineral acid and is carried out at a temperature of from room temperature to 130° C.

11. A method of producing a hydrogen absorbing alloy powder in accordance with claim 7, wherein the pre-treating is with an alkali which is at least one hydroxide selected from a group consisting of lithium hydroxide, sodium hydroxide and potassium hydroxide.

12. A method of producing a hydrogen absorbing alloy powder in accordance with claim 7, wherein the pre-treating is with an alkali at a concentration from 1.0 N to 10.0 N.

13. A method of producing a hydrogen absorbing alloy powder in accordance with claim 7, wherein the pre-treating is with an alkali at a temperature of from room temperature to 150° C.

14. A method of producing a hydrogen absorbing alloy powder in accordance with claim 7, wherein the pulverized hydrogen absorbing alloy has a composition represented by $(La)_x R_{1-x}(Ni_a M_b)$ wherein R is at least one rare earth element selected from a group consisting of Ce, Pr and Nd, M is at least one metallic element selected from a group consisting of Mn, Al, Co, Ti, Fe, Cu and Zr, x is from 0.2 to 1, a+b is from 4.0 to 6.0 and $0 < b \leq 2.0$.

* * * * *